(12) United States Patent
Kull

(10) Patent No.: US 6,815,854 B2
(45) Date of Patent: Nov. 9, 2004

(54) LOW POWER SPINDLE MOTOR WITH A FIXED SHAFT

(75) Inventor: Andreas Kull, Donaueschingen (DE)

(73) Assignee: Minebea Co., Ltd (JP)

(*) Notice: Subject to any disclaimer, the term of this patent is extended or adjusted under 35 U.S.C. 154(b) by 0 days.

(21) Appl. No.: 10/385,910

(22) Filed: Mar. 11, 2003

(65) Prior Publication Data

US 2003/0201682 A1 Oct. 30, 2003

Related U.S. Application Data

(60) Provisional application No. 60/363,937, filed on Mar. 12, 2002, and provisional application No. 60/363,821, filed on Mar. 12, 2002.

(30) Foreign Application Priority Data

| Aug. 19, 2002 | (DE) | ......... 102 37 848 |
| Aug. 19, 2002 | (DE) | ......... 102 37 849 |
| Aug. 22, 2002 | (DE) | ......... 103 38 558 |

(51) Int. Cl.⁷ .................................. H02K 7/08
(52) U.S. Cl. ..................... 310/90; 310/67 R
(58) Field of Search ................. 310/90, 67 R, 310/89

(56) References Cited

U.S. PATENT DOCUMENTS

| 5,277,499 A | 1/1994 | Kameyama |
| 5,427,456 A | 6/1995 | Hensel |
| 5,667,309 A | 9/1997 | Nose |
| 5,793,129 A * | 8/1998 | Parsoneault et al. .......... 310/42 |
| 5,825,585 A | 10/1998 | Hatam-Tabrizi |
| 6,307,293 B1 | 10/2001 | Ichiyama |
| 6,313,967 B1 | 11/2001 | Bodmer et al. |

OTHER PUBLICATIONS

German Office Action dated Sep. 19, 2003.
German Office Action dated Sep. 22, 2003.

* cited by examiner

*Primary Examiner*—Thanh Lam
(74) *Attorney, Agent, or Firm*—Joel Lutzker; Anna Vishev; Schulte Roth Zabel

(57) ABSTRACT

A spindle motor for use in a disk drive having a base frame, a housing cover, a fixed shaft and a rotatable bearing sleeve. The fixed shaft has a larger diameter section and a smaller diameter section with a step formed therebetween. The rotatable bearing sleeve has a central cylindrical opening, the shaft being inserted into the central cylindrical opening. A bearing gap is formed between the fixed shaft and the rotatable bearing sleeve, the bearing gap being filled with lubricating fluid. One end of the fixed shaft is secured to the base frame while another end of the shaft is secured to the housing cover.

10 Claims, 2 Drawing Sheets

LOW POWER SPINDLE MOTOR WITH A FIXED SHAFT

RELATED APPLICATIONS

This application claims all rights of priority to U.S. Provisional Patent Application No. 60/363,937, filed Mar. 12, 2002 (now abandoned), U.S. Provisional Patent Application No. 60/363,821, filed Mar. 12, 2002 (now abandoned), German Patent Application Ser. No. DE 102 37 848.7, filed Aug. 19, 2002 (pending), German Patent Application Ser. No. DE 102 37 849.5, filed Aug. 19, 2002 and to German Patent Application No. 102 38 558.0, filed Aug. 22, 2002 (pending).

FIELD OF THE INVENTION

The following invention relates to brushless direct current spindle motors of the type used in disk drives and in particular relates to improvements in hydrodynamic bearings for such motors.

BACKGROUND OF THE INVENTION

Disc drive systems have been used in computers and other electronic devices for many years for storage of digital information. Information is recorded on concentric memory tracks of a magnetic disc medium, the actual information being stored in the form of magnetic transitions within the medium. The discs themselves are rotatably mounted on a spindle, the information being accessed by means of transducers located on a pivoting arm which moves radially over the surface of the disc. The read/write heads or transducers must be accurately aligned with the storage tracks on the disc to ensure proper reading and writing of information; thus the discs must be rotationally stable.

Electric spindle motors of the type used in disk drives conventionally rely on ball bearings to support a rotary member, such as a rotating hub, on a stationary member, such as a shaft. Ball bearings are known to wear parts, and in time increased friction will cause failure of the motor. In addition, ball bearings create debris in the form of dust or fine particles that can find their way into "clean" chambers housing the rotary magnetic disks which are driven by the motor. The mechanical friction inherent in ball bearings also generates heat, noise and vibration, all of which are undesirable in a disk drive motor.

Fluid bearings represent a considerable improvement over conventional ball bearings in spindle drive motors. In these types of systems, lubricating fluid, either gas or liquid, functions as the actual bearing surface between a stationary base or housing in the rotating spindle or rotating hub of the motor. Liquid lubricants, for example, oil, complex ferromagnetic fluids or even air, have been utilized in hydrodynamic bearing systems. As compared with ball bearings, fluid dynamic bearings have improved running accuracy, greater impact strength and lower noise generation.

One example of a spindle motor utilizing a prior art fluid dynamic bearing is disclosed in U.S. Pat. No. 5,658,080. The '080 patent shows a spindle motor including a shaft retained in a shaft retainer and a thrust plate provided to the shaft. A thrust dynamic pressure fluid bearing is provided between the thrust plate and the shaft retainer. A radial dynamic pressure fluid bearing is provided between the shaft retainer and the shaft. A ring-shaped space formed between the outer circumferential surface of the thrust plate and the inner circumferential surface of the shaft retainer is partially filled with oil. Ring-shaped projections are provided on the outer circumferential surface of the thrust plate. When the motor is running at a high-speed, oil in the ring-shaped space is retained on the shaft retainer and through this oil, oil in the thrust dynamic pressure fluid bearings at the upper and lower surface sides are communicated with each other.

SUMMARY OF THE INVENTION

It is an object of the present invention to provide a spindle motor with a stepped shaft which saves run-current and, therefore, reduces power consumption of the spindle motor.

Present invention provides a spindle motor for use in a disk drive having a base frame, a housing cover, a fixed shaft and a rotatable bearing sleeve. The fixed shaft has a larger diameter section and a smaller diameter section with a step formed therebetween. The rotatable bearing sleeve has a central cylindrical opening, the shaft being inserted into the central cylindrical opening. A bearing gap is formed between the fixed shaft and the rotatable bearing sleeve, the bearing gap being filled with lubricating fluid. One end of the fixed shaft is secured to the base frame while another end of the shaft is secured to the housing cover.

The above and other objects, aspects, features and advantages of the invention will be more readily apparent from the description of the preferred embodiments thereof taken in conjunction with the accompanying drawings.

BRIEF DESCRIPTION OF THE DRAWINGS

The invention is illustrated by way of example and not limitation and the figures of the accompanying drawings in which like references denote like or corresponding parts, and in which.

DETAILED DESCRIPTION OF THE PREFERRED EMBODIMENTS AND THE DRAWINGS

Figure 1:
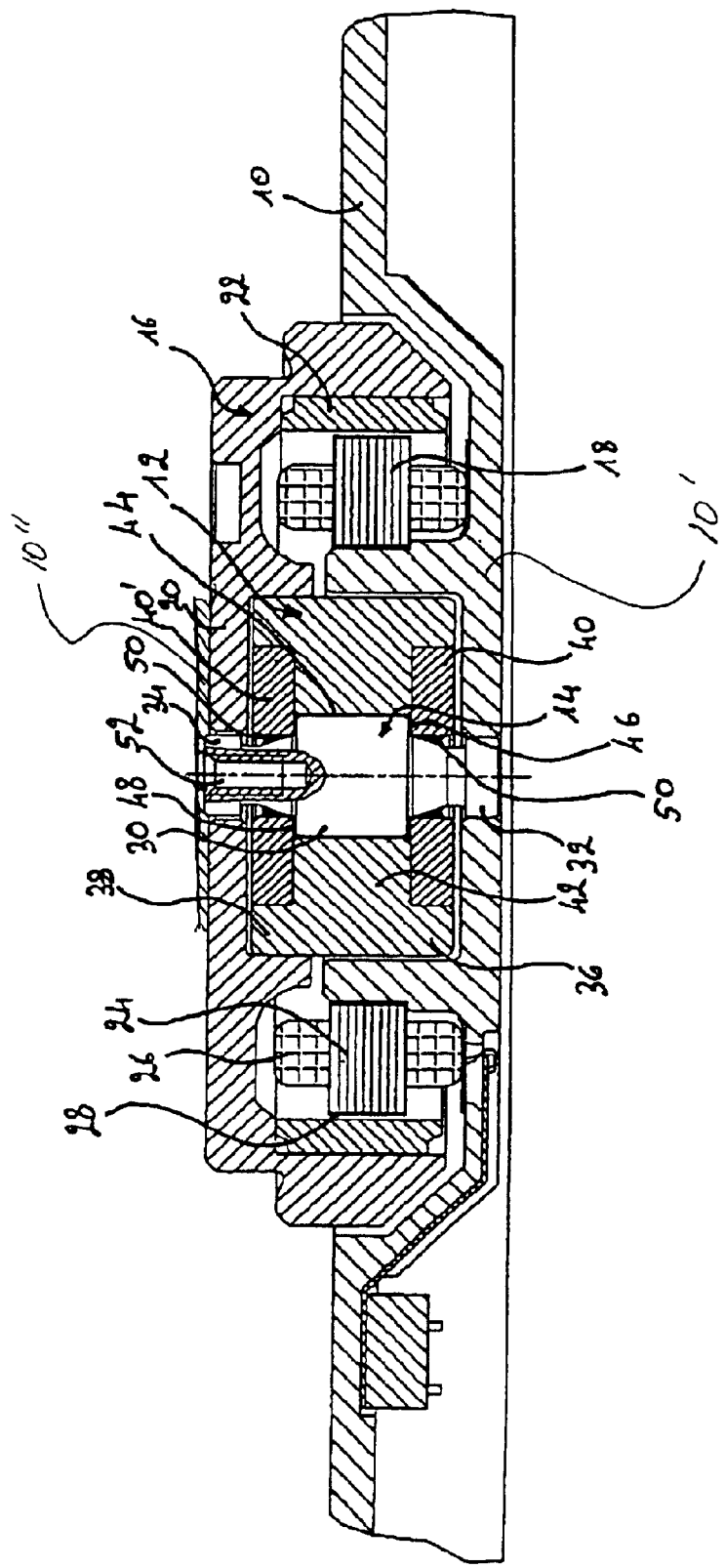
FIG. 1 is a side cut-away view of an electronic spindle motor having a fixed stepped shaft with a thrust-washer, the shaft is capable of being attached to a top housing cover (not shown) of the disk drive.

The spindle motor shown in FIG. 1 includes a base 10' having a flange 10 for incorporation into a disk drive. Alternatively the flange may be integrated into a base plate of the disk drive (not shown in the figure). One end of the shaft 14 is connected to the flange 10 or the base plate, the other end of the shaft 14 is connected to a further housing part of the disk drive, in particular the top cover. The shaft 14 is surrounded by the bearing sleeve 12 at a small radial distance, wherein the bearing sleeve is fixedly connected with a rotor 16. A stator 18 is connected to the shaft 14 via the flange 10 or the base plate. The bearing sleeve 12 rotates relative to shaft 14.

The rotor 16 comprises a hub 20 and a rotor magnet 22, which is connected to the inside of a circumferential wall of the rotor hub 20, e.g. being moulded or bonded thereto. The outside of this circumferential wall of the rotor hub 20 is shaped in such a way that it can hold one or more magnetic disks (not shown).

The stator 18 comprises a core 24 and stator windings 26, which are wound around the core 24. Stator 18 and rotor 16 are separated by a concentrical gap of small width, the air gap.

In the embodiment of FIG. 1, the shaft 14 is subdivided into three sections, a larger diameter shaft section 30 and two smaller diameter shaft sections 32, 34. The shaft 14 is surrounded by the bearing sleeve 12, which, in the embodiment of FIG. 1, can also be subdivided into three sections. A first and a second section 36, 38 of the bearing sleeve 12 are located at the open ends of the bearing sleeve and have a relatively large, constant internal diameter, the annular disks 40, 40' being inserted in these bearing sleeve sections, e.g. by moulding or bonding. The annular disks 40, 40' are provided for an abutment, as described in detail hereinafter. The third section 42 of the bearing sleeve 12 has a smaller, constant internal diameter and embraces with a limited spacing the larger diameter shaft section 30, so that a bearing gap 44 is formed between this shaft section and the bearing sleeve 14.

In the case of the fluid dynamic bearing according to the invention shown in FIG. 1, two fluid dynamic thrust bearings are formed in the following way. Between the larger diameter shaft section 30 and the first, smaller diameter shaft section 32 is formed a step or shoulder 46, which faces one surface of the annular disk 40. While one or both of the facing surfaces of the annular disk 40 and the step 46 are provided with groove patterns for forming an axial thrust bearing. A second, fluid dynamic thrust bearing is formed at a step or shoulder 48, which is shaped between the larger diameter shaft section 30 and the second, smaller diameter shaft section. Said step 48 faces a surface of the annular disk 40', and in the facing surfaces once again groove patterns can be formed.

One or more journal bearings can be provided on the circumference of the larger diameter shaft section 30, as a function of the available shaft length and the demands made on the bearing stiffness.

Between the central, inner opening of the annular disks 40, 40' and the smaller diameter shaft sections 32, 34 surrounded by the same is formed a conically tapering annular clearance 50, which is connected by means of a capillary gap to the bearing gap 44. A continuous capillary film of bearing fluid extends from the bearing gap 44 into the annular clearance 50. The annular clearance 50 serves as a compensating volume and lubricating reservoir for the bearing gap 44 and forms a capillary seal.

The spindle motor shown in FIG. 1, with a fluid dynamic bearing having a shaft clamped on either side has particularly low vibration characteristics when operating. As the shaft is connected on both sides, a bearing arrangement is obtained, having good axial and radial stiffness, even when the thrust bearings are designed with minimum contact surfaces. Accordingly, the power consumption of the bearing can be reduced.

Shaft 14 has a bore 52 with an internal thread for connection to a cover of the disc drive (schematically shown as 10") or the like.

In the case of the fluid dynamic bearing of FIG. 1, a first and a second fluid dynamic thrust bearing are formed at the first and second step 46, 48, respectively, in order to absorb opposing axial forces. These thrust bearings are formed in simple manner without using thrust plates between the shoulders formed by the steps on the shaft 14 and the facing surfaces of the annular disks 40, 40'. The annular disks 40, 40' in the embodiment shown are inserted in corresponding cavities in the bearing sleeve 12, but in another embodiment can also be engaged on the end of the bearing sleeve.

The fluid dynamic bearing shown in FIG. 1 can also be called a spool bearing as a result of its shape.

Figure 2:
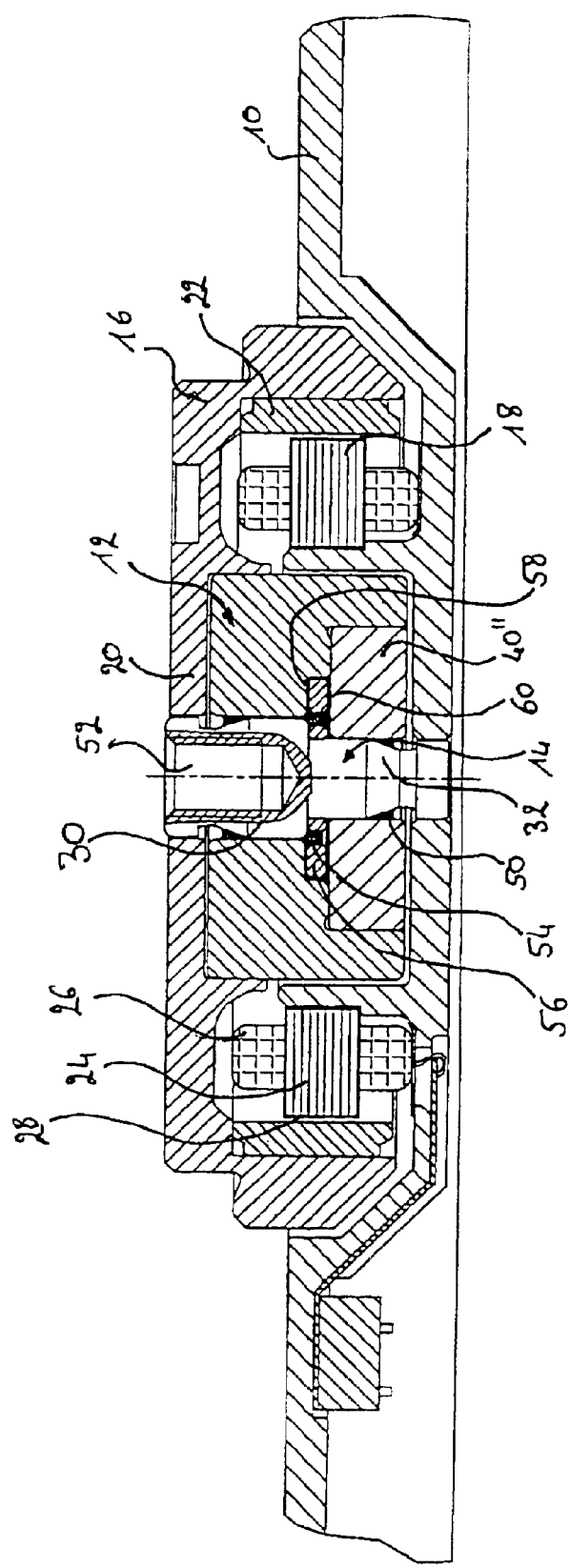
FIG. 2 is a side cut-away view of an electronic spindle motor having a fixed shaft capable of being attached to a top cover (not shown) of the disk drive.

FIG. 2 shows another embodiment of the spindle motor with a fluid dynamic bearing according to the invention. The spindle motor of FIG. 2 has the same structure as that of FIG. 1, and the same parts are given the same reference numerals and will not be described again. The fluid dynamic bearing comprises a shaft 14, whose one end is clamped in the flange 10 and whose other end is clamped in a housing cover of the disc drive or is fixedly connected therewith. For this purpose a bore 52 is provided in shaft 14.

In the embodiment of FIG. 2, the shaft 14 has a larger diameter section 30 and a smaller diameter section 32. Between said two shaft sections is formed a step or shoulder 54, adjacent to which a thrust plate 56 is engaged on the shaft, e.g. pressed on or bonded thereto. The thrust plate 56 is located between the bearing sleeve 12 and an annular disk 40 placed on or in the bearing sleeve. The thrust plate forms a fluid dynamic thrust bearing with the annular disk 40 at the interfaces 58 or 60. At said interfaces 58 or 60 of the thrust plate 56 and/or the facing surfaces of the annular disk 40" or the bearing sleeve 12 groove patterns can be provided to avoid material contact during operation. The groove patterns can be in the form of spirals, a herringbone pattern or the like.

In the case of the fluid dynamic bearing of FIG. 2, the thrust bearings are formed in the region of the thrust plate 56 roughly in the center of the shaft at step 54, whereas in the embodiment of FIG. 1 the thrust bearings are formed closer to the ends of the bearing sleeve 12, once again in the region of the steps 46, 48. In both cases the thrust bearings can be implemented with a relatively limited axial stiffness, which leads to a limited power consumption for the thrust bearings, because the bilateral clamping of the shaft 14 ensures an adequate stability of the bearing.

As described relative to FIG. 1, in the embodiment of FIG. 2, concentric, conically tapering spaces can be provided at the shaft ends, so as to form capillary seals. These conically tapering spaces can be formed by a taper of the corresponding shaft sections, as shown in FIG. 2. Alternatively the shaft sections can be linear and a chamfer can be provided on the annular disk 40 or in the region of the end of the bearing sleeve 12, so as to form the conically tapering space.

For the convenience of the reader, the above description has focused on a representative sample of all possible embodiments, a sample that teaches the principles of the invention and conveys the best mode contemplated for carrying it out. The description has not attempted to exhaustively enumerate all possible variations. Other undescribed variations or modifications may be possible. For example, where multiple alternative embodiments are described, in many cases it will be possible to combine elements of different embodiments, or to combine elements of the embodiments described here with other modifications or variations that are not expressly described. Many of those undescribed variations, modifications and variations are within the literal scope of the following claims, and others are equivalent.

What is claimed is:

1. A spindle motor for use in a disk drive comprising:

a fixed shaft having a larger diameter section and a smaller diameter section with a step formed therebetween;

a rotatable bearing sleeve having a central cylindrical opening, said shaft being inserted into said central cylindrical opening;

a bearing gap formed between said fixed shaft and said rotatable bearing sleeve, said bearing gap being filled with lubricating fluid;

a base frame; and a housing cover, wherein one end of said fixed shaft is secured to the base frame while another end of said fixed shaft is secured to the housing cover.

2. The spindle motor according to claim 1, wherein a first hydrodynamic thrust bearing is formed in the area of said step.

3. The spindle motor according to claim 2 further comprising an annular disk sealing said central cylindrical opening of said bearing sleeve, said annular disk being in an opposing relationship with said step.

4. The spindle motor according to claim 3, wherein said first hydrodynamic thrust bearing is formed between said step and said annular disk.

5. The spindle motor according to claim 4, wherein a hydrodynamic radial bearing is formed in the area of said larger diameter section of said shaft.

6. The spindle motor according to claim 5, wherein said fixed shaft further comprises a second smaller diameter section with a second step being formed between said second smaller diameter section and said larger diameter section, wherein a second hydrodynamic thrust bearing is formed in the area of said second step, and wherein said hydrodynamic radial bearing is located between said first hydrodynamic thrust bearing and said second hydrodynamic thrust bearing.

7. The spindle motor according to claim 6 further comprising a second annular disk sealing said central cylindrical opening of said bearing sleeve, said second annular disk being in an opposing relationship with said second step.

8. The spindle motor according to claim 7, wherein said second hydrodynamic thrust bearing is formed between said second step and said second annular disk.

9. The spindle motor according to claim 3, wherein a tapered capillary seal is formed at an open end of said annular disk, said tapered capillary seal sealing said lubricating fluid in said bearing gap.

10. The spindle motor according to claim 7, wherein a second tapered capillary seal is formed at an open end of said second annular disk, said second tapered capillary seal sealing said lubricating fluid in said bearing gap.

* * * * *